J. P. Gruber,
Water Filter,
Nº 53,606.        Patented Apr. 3, 1866.
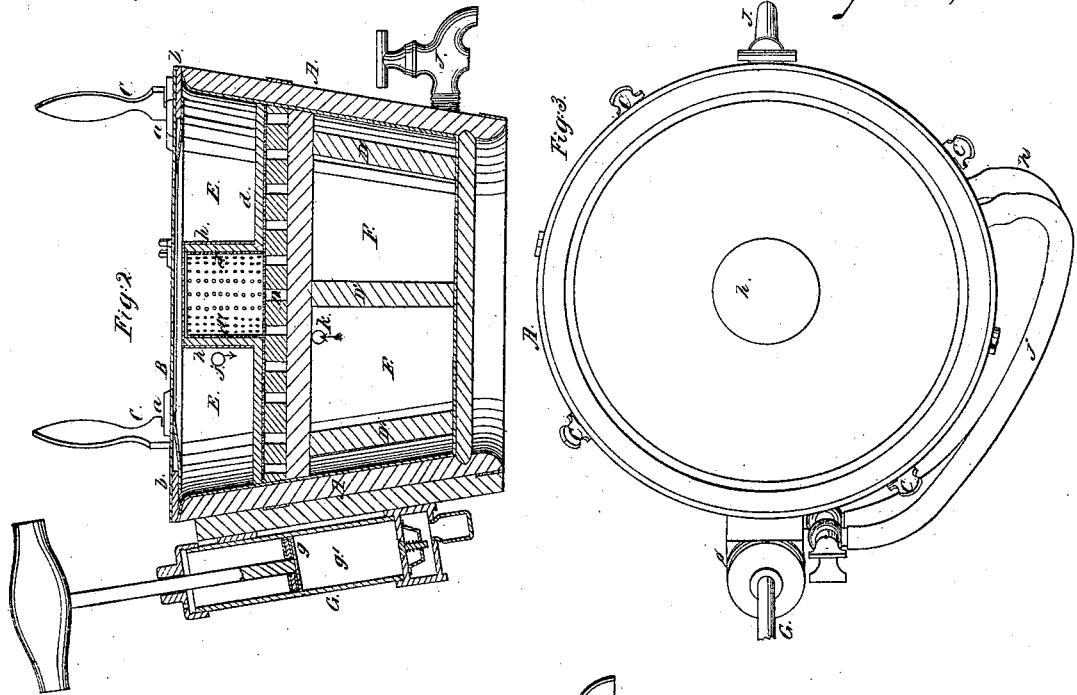
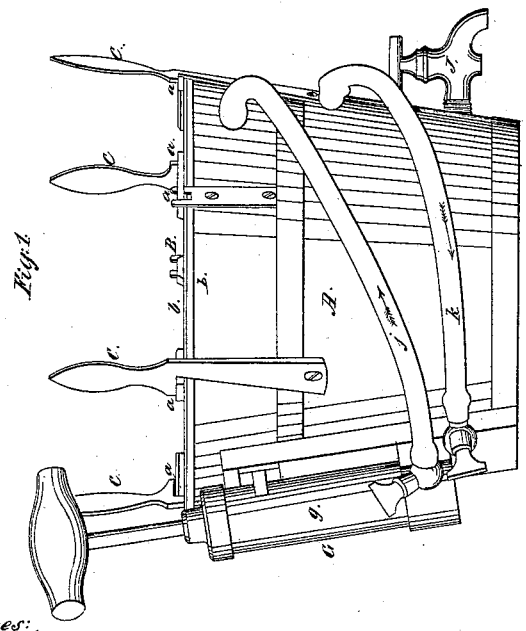
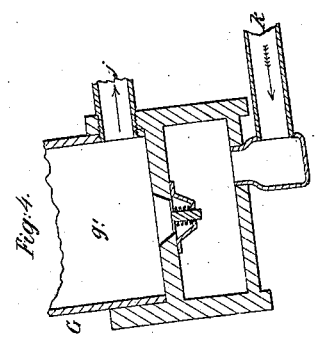

UNITED STATES PATENT OFFICE.

JOHN P. GRUBER, OF NEW YORK, N. Y.

IMPROVEMENT IN FILTERING APPARATUS.

Specification forming part of Letters Patent No. 53,606, dated April 3, 1866.

*To all whom it may concern:*

Be it known that I, JOHN P. GRUBER, of the city and county of New York, and State of New York, have invented a new and Improved Filtering Apparatus; and I do hereby declare that the following is a full, clear, and exact description thereof, reference being had to the accompanying drawings, making a part of this specification, in which—

Figure 1 is an elevation of one side of the apparatus. Fig. 2 is a vertical central section through the apparatus. Fig. 3 is top view of the apparatus with the cover removed. Fig. 4 is a sectional view of the base of the air-pump, showing the connection of the pipes *j k* therewith.

This invention is intended for facilitating the operation of filtration for making extracts, purifying liquids, separating solid substances from liquids, and other purposes; and it consists in the employment of an exhausting and forcing air-pump in conjunction with a vessel having two chambers which are separated from each other by a filtering substance, and which communicate with the exhausting and forcing chambers of the pump, as will be hereinafter described.

To enable others skilled in the art to understand my invention, I will describe its construction and operation.

In the accompanying drawings, A represents a circular vessel, which may be made of any desired capacity, and which should be strengthened and lined with an air-tight substance, so that it will sustain a considerable external pressure without liability of leaking or collapsing.

B represents a movable cover for the vessel A, which is confined in its place by means of levers C C C, having hooks on them which catch over projections *a a a* at the circumference of the cover and draw this cover down hard upon the top of the vessel A, as shown in Figs. 1 and 2. A ring, *b*, of india-rubber, should be interposed between the cover B and the edge of the vessel A for the purpose of securing an air-tight joint at this point.

Within the vessel A is a horizontal partition, D, which is filled with perforations, as shown in Fig. 2, and suitably supported above the bottom of the vessel A by legs D' D', so as to form two chambers, E F. This partition D fits snugly against the inside surface of the vessel A when in its place, and it can be removed from this vessel at pleasure.

On top of the partition D is a finely-perforated plate, *d*, in the center of which is a perforated cylinder, *d'*, which extends up nearly as high as the chamber E. (Shown in Fig. 2.) The upper surface of the plate *d* and the outside surface of the cylinder *d'* are covered with felt, cloth, or other suitable filtering material. The cylinder *d'* may be entirely or partially covered by a movable cap, *h*, which can be adjusted up or down, as may be desired.

On the outside of the vessel A is an exhausting and forcing air-pump, G, which has a solid piston, *g*, working in a cylinder, *g'*. Below the piston *g* two pipes, *j k*, are applied to the pump and provided with suitable valves. The pipe *j* conducts air from the upper portion of the pump-barrel into the upper chamber, E, of the vessel A. The pipe *k* conducts air from the chamber F of the vessel A into the lower chamber of the pump.

The liquid to be filtered is poured into the chamber E and the cover B confined in its place. The pump is then operated and the air in chamber F exhausted at the same time that air is forced into the chamber E above the liquid therein. This will compel the liquid to pass through the filtering substance and into the chamber F, from which it can be drawn by the cock J.

In making solutions, the cap *h* is elevated so as to allow the clear liquid to be drawn through the cylinder *d'* above the insoluble substance upon the filtering medium. In some cases the solid matter will completely cover the filtering substance upon the partition D, and render it very slow and difficult to force the clear solution through the said substance. In such case the liquid is drawn through the cylinder *d'* above the solid substance as well as through it.

Having thus described my invention, what I claim as new, and desire to secure by Letters Patent, is—

1. The combination of an exhausting and forcing air-pump with a filtering-vessel which is constructed with a central filtering-partition, a movable cover, and with pipes $j\ k$ leading from the chambers E F to the pump chambers, substantially as described.

2. The combination of the adjustable imperforated cap $h$ with the cylinder $d'$ and partition D $d$, arranged within a vessel, A, which communicates with an exhausting and forcing air-pump, substantially as described.

Witness my hand in the matter of my application for a patent on an improved filtering apparatus this 15th day of February, 1865.

JOHN P. GRUBER.

Witnesses:
R. T. CAMPBELL,
EDW. SCHAFER.